March 7, 1939. G. M. FINKES 2,149,429
LAWN BROOM
Filed Oct. 13, 1937
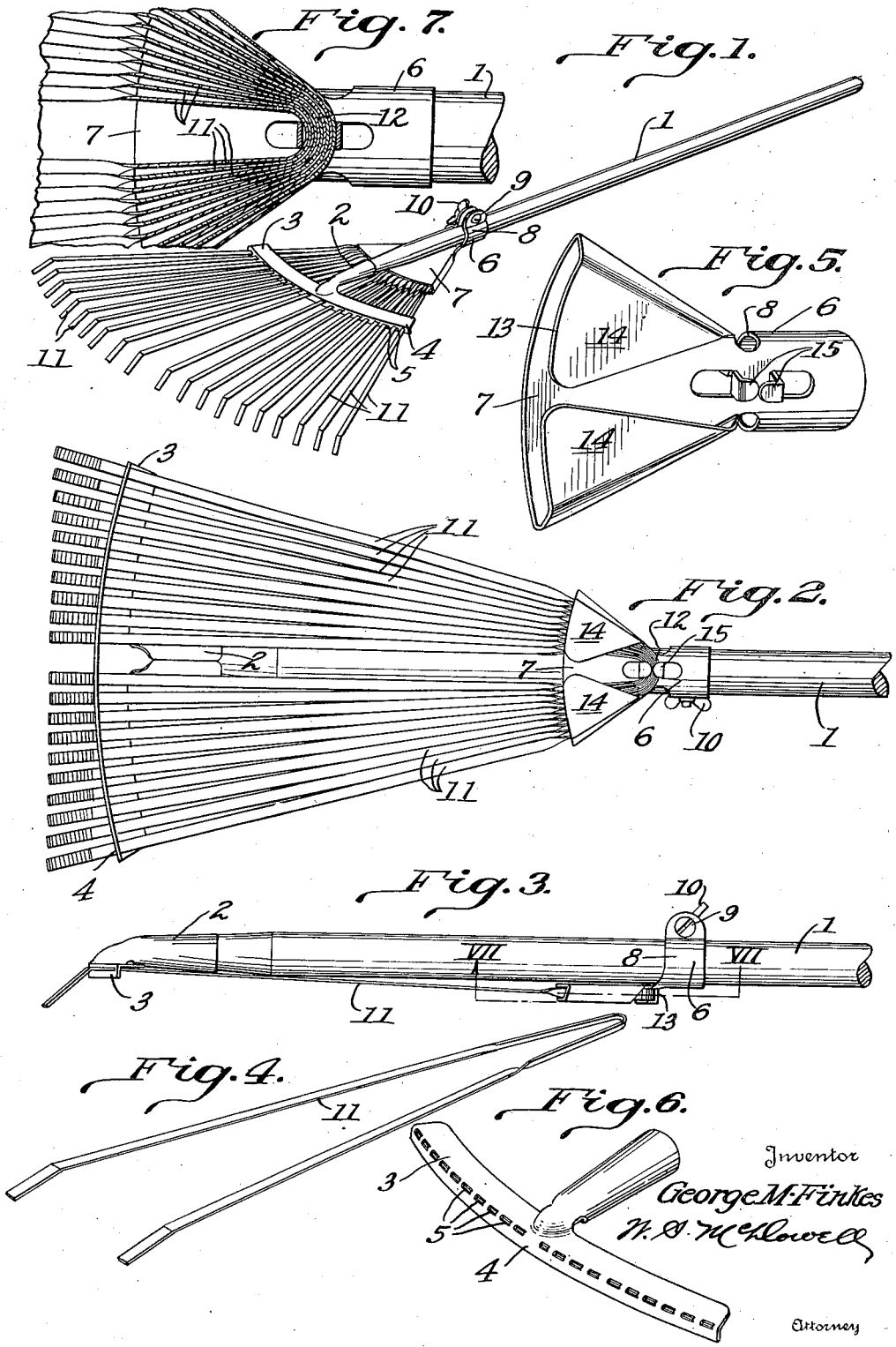

Patented Mar. 7, 1939

2,149,429

UNITED STATES PATENT OFFICE 2,149,429

LAWN BROOM

George M. Finkes, Columbus, Ohio, assignor to The Union Fork and Hoe Company, Columbus, Ohio, a corporation of Ohio Application October 13, 1937, Serial No. 168,775

4 Claims. (Cl. 55—10)

This invention relates to lawn brooms of the hand operated type used in the sweeping or raking of lawns, in the gathering of loose scattered materials, such as leaves, twigs, small tree branches or the like, the object of the invention being to provide a broom of this character wherein structural provision is made for conveniently forming the spacing of the metallic tines, in order to readily adapt the broom to different operating conditions and enable the tines to be compactly positioned during storage and shipment of the brooms.

Another object of the invention resides in an adjustable tine lawn broom wherein each of the tines is formed from a flat thin strip of metal, the intermediate portions of said tines being twisted or bent to occupy planes at right angles to those of the outer portions of the tines, the bent intermediate portions of said tines being nested or grouped together and held at a single point so that the tine assembly will be rendered conveniently flexible for expansion and contracting movements and facility and economy obtained in manufacture.

For a further understanding of the invention, reference is to be had to the following description and the accompanying drawing, wherein:

Fig. 1 is a perspective view of a lawn broom formed in accordance with the present invention, the tines of the broom being disclosed in their expanded or separated positions;

Fig. 2 is a plan view of the broom disclosing the tines in their contracted positions;

Fig. 3 is an edge elevation of the broom with the parts thereof in the position disclosed in Fig. 2;

Fig. 4 is a perspective view of one of the tines removed from the tool;

Fig. 5 is a detail perspective view of the runner member;

Fig. 6 is a similar view of the slotted guide bar.

Fig. 7 is a detail sectional view through the intermediate portions of the tines at the point where these members are nested or grouped together, the plane of the section being indicated by the line VII—VII of Fig. 3.

Referring more particularly to the drawing, my improved lawn broom comprises an elongated cylindrical handle 1 of wood or other suitable material. The outer end of the handle is tapered and stationarily positioned in a correspondingly shaped socket formed in a metallic ferrule 2. Formed with or permanently secured to this ferrule at the outer end of the handle is an arcuate guide bar 3, the said bar being formed along its outer edge with a right angularly bent flange 4, the latter being provided with a multiplicity of substantially uniformly spaced slots 5.

Mounted for longitudinal adjustment on the handle 1 is a metallic runner member 6. This member preferably comprises a sheet metal stamping comprising a flat body plate 7 of substantially triangular formation. At its inner end, the plate 7 terminates in a pair of resilient curved, handle embracing members 8, the spaced ends of the latter being apertured for the reception of a headed bolt 9, the threaded shank of said bolt carrying a wing nut 10. By tightening the wing nut, the members 8 may be held in frictional engagement with the handle in order to clamp the runner member in any desired position of longitudinal adjustment on said handle.

Connected with the runner member and movable in unison therewith is a plurality of adjustable tines 11. Each of these tines is formed from an elongated narrow strip of flat-surfaced metal, the said strips being of uniform width but varying slightly as to length, so that the outer ends of said tines will terminate in the same transverse plane, as shown in Fig. 2. Intermediately of its length, each tine strip is bent or twisted so that its intermediate portion occupies a plane at right angles or perpendicular to the plane of its outer portions. These intermediate portions are grouped or nested, as indicated at 12 and are arranged within a socket 13 formed in connection with the runner member, the socket being produced by bending inwardly the ears 14 which constitute continuations of the plate 7, the ears 14 serving as guide members for the intermediate portions of the tine strips and limit their expanding movement. By bending the tine strips intermediately of their lengths, it will be observed that each strip provides a pair of diverging tines which are freely flexible or resilient at the region of attachment of the strips to the runner member. This attachment is preferably effected by stamping the runner member to include a pair of bendable prongs 15, which are struck outwardly and bent into holding or gripping engagement with the nested intermediate portions of the tine strips.

When it is desired to adjust the spacing of the tines, the wing nut is loosened which allows the runner member to be advanced longitudinally on the handle in either a forward or rearward direction. As the runner member is advanced forwardly, the spacing between the outer portions of the tines is increased and, conversely, if the runner member is pulled inwardly or upwardly on the handle, the spacing of the tines is decreased to a minimum. Of course, various intermediate positions of adjustment of the runner member and the associated tines can be secured.

While I am aware that lawn brooms or rakes have heretofore been proposed having tines supported for radial adjustment, yet, so far as I am aware, such prior constructions do not employ tines provided with the bent intermediate portions arranged and secured as disclosed herein so that each strip comprises a pair of tines. In the present invention, the riveting of the inner ends of the tines for pivotal connection with the runner member is avoided and a stronger, more economical and durable construction thus produced.

What is claimed is:

1. A lawn broom comprising a handle, a guide bar secured to the outer end of the handle and provided with a plurality of spaced slots, a runner member adjustable longitudinally of the handle and formed with a tine-receiving socket, and a plurality of flat metallic strips constituting tines, the intermediate portions of said strips being twisted and disposed to occupy planes perpendicular to those of the outer portions of the strips, the said intermediate portions being nested together and secured to said runner, each of said strips forming a pair of tines and having the outer portions thereof slidably received within the guide bar slots.

2. A lawn broom comprising a handle, a guide bar fixed to the outer ends of the handle and provided with a plurality of spaced slots, a runner adjustable longitudinally of the handle, said runner being formed to include a tine-holding body adjustably clamped to said handle, a plurality of flat metallic strips constituting tines, the intermediate portions of said strips being bent to occupy planes arranged at right angles to the planes of the outer portions of the strips, the said outer portions of the strips being slidably received in the slots of said guide bar, the intermediate portions of said strips being nested together to render the strips flexible in a transverse vertical plane, and means for immovably securing the inner nested ends of said strips to said runner.

3. In a lawn broom of the type having a handle, a slotted guide bar and a plurality of nested tines slidably positioned in the slots in said guide bar, means for supporting the inner portion of said tines comprising a sheet metal member having a fan-shaped body, a split sleeve provided at one end of said body and projecting from one face thereof, and a plurality of spaced prongs extending from said body in a direction opposed to that of said sleeve, the outer ends of said prongs being bent to overhang the nested portion of the tines disposed between said prongs.

4. In a lawn broom of the type having a handle, a slotted guide bar and a plurality of tines nested at their central portion and having their outer portions slidably positioned in the slots in the guide bar, means for supporting and moving said tines comprising a sheet metal member having a fan-shaped body, a split sleeve provided adjacent the narrow end of said body and projecting from one face thereof, and a plurality of spaced prongs extending from said body between said sleeve and the fan-shaped portion thereof, said prongs projecting from the body in a direction opposed to that of said sleeve and having the outer ends overhanging the nested portions of the tines disposed between said prongs.

GEORGE M. FINKES.